Patented May 26, 1925.

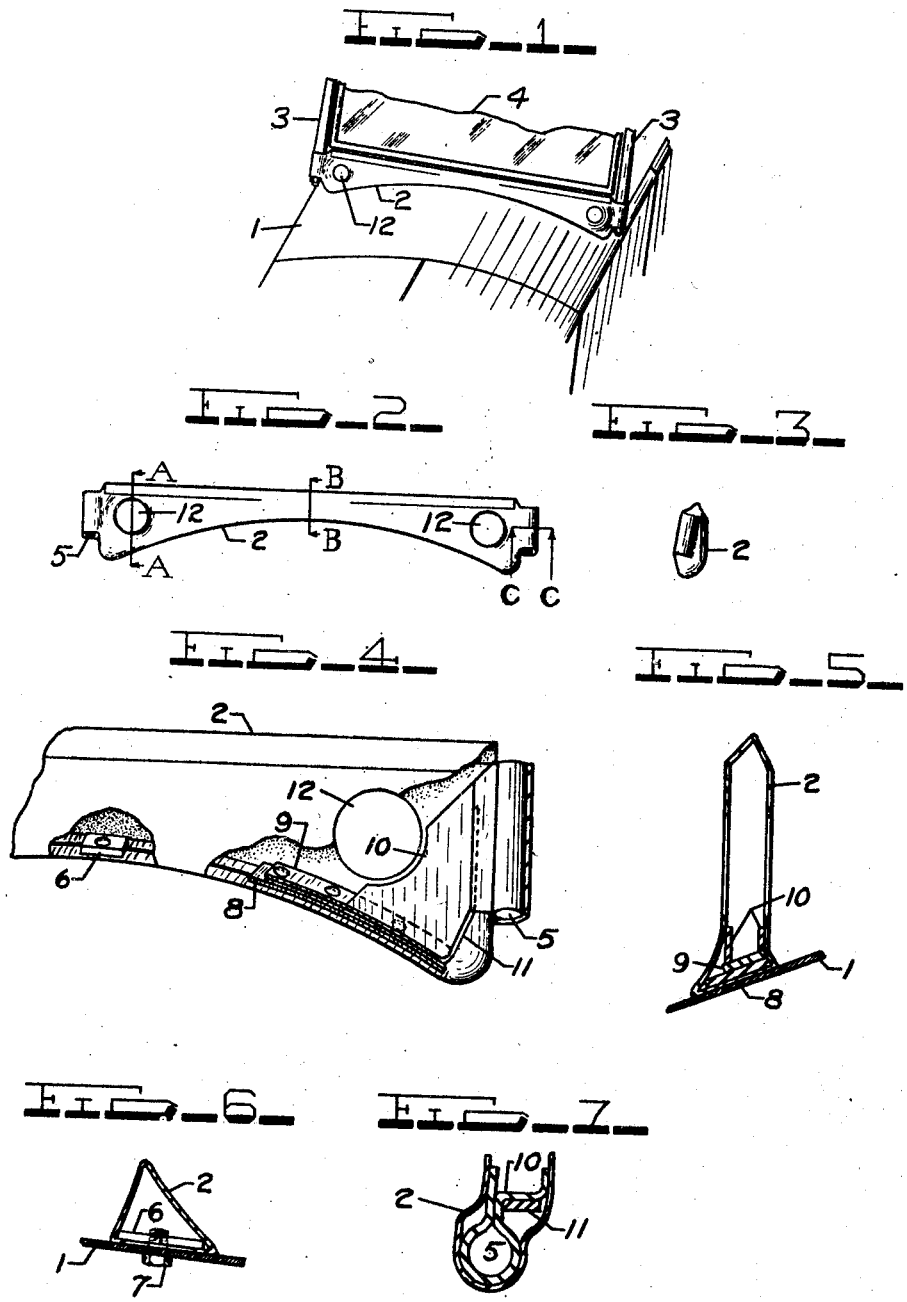

1,539,006

UNITED STATES PATENT OFFICE.

MAX F. WOLLERING, OF HIGHLAND PARK, MICHIGAN, ASSIGNOR TO THE STUDEBAKER CORPORATION, OF DETROIT, MICHIGAN, A CORPORATION OF NEW JERSEY.

WINDSHIELD BASE.

Application filed August 2, 1923. Serial No. 655,354.

*To all whom it may concern:*

Be it known that I, MAX F. WOLLERING, a citizen of the United States of America, and resident of Highland Park, in the county of Wayne and State of Michigan, have invented certain new and useful Improvements in Windshield Bases, of which the following is a specification.

This invention relates to improvements in windshield bases for motor driven vehicles and the like, and the object of my improvements as compared to the usual construction is to provide such an article that will be lighter in weight, which will take enamel better, and which will cost less to manufacture.

Windshield bases have been made heretofore of castings and the like which, because of the design, are relatively heavy, need considerable trimming and finishing before enameling, and are relatively expensive to manufacture. The present invention provides such an article formed from pressed metal which eliminates to a great extent the objectional features of the type used heretofore.

Such a windshield base embodying my present invention is illustrated in the accompanying drawings in which:

Fig. 1 is a fragmentary perspective view of an automobile having a windshield base embodying my invention mounted thereon.

Fig. 2 is a front view of the windshield base shown mounted on the automobile in Fig. 1.

Fig. 3 is an end view of the windshield base of Fig. 2.

Fig. 4 is a fragmentary front view of one end of the windshield base of Fig. 2, with part of the outside broken away to show the reinforcements underneath.

Fig. 5 is a vertical section taken on the line A—A of Fig. 2.

Fig. 6 is a vertical section taken on the line B—B of Fig. 2.

Fig. 7 is a horizontal section taken thru a portion of one end of the windshield base as indicated at C—C, Fig. 2.

1 is a body portion, known as a cowl, of an automobile. A windshield base 2 is mounted thereon as will be described, the windshield base 2 carrying members 3 which suitably support a windshield 4. The windshield base 2 is formed on its lower side to conform in shape to the portion of the cowl 1 on which it is supported and which it fits. The upper edge is preferably straight in order that a windshield 4 having a straight lower edge may be used in connection therewith. The ends are formed with vertical or nearly vertical openings 5 therein to receive the lower ends of the members 3 which support the windshield 4. The main portion of the windshield base 2 is formed from sheet metal bent into an approximately U shaped or channel section suitably reinforced from within as shown in Figures 4, 5, 6 and 7. The body portion of the base 2 is preferably formed from one piece of metal bent over as shown, altho two or more pieces suitably formed may be welded or otherwise fastened at different points to effect the same result. The free bottom edges are bent inwardly to give added strength and also to help hold the reinforcing and attaching members. Members 6, extending across the bottom of the windshield base 2 and over the edges of which the lower edge of the body portion of the base 2 is bent as has been described, serve to stiffen the same and also to provide means for attaching the base 2 to the cowl 1. This latter means is provided by threading openings in the member 6, and passing screws 7 from the underside of the cowl 1 into the threaded openings, thus securely holding the base 2 to the cowl 1. The securing of the member 6 as shown is a preferable construction altho the inturned lower edges of the base 1 may be dispensed with and the members 6 welded or otherwise fastened in place. Inasmuch as the ends support the windshield supporting members 3, they must be relatively strong, and I have provided suitable means for reinforcing the same consisting of the members 8, 9 and 10. The member 8 is similar to the member 6 except that it is longer, and the member 9 is of slightly less width than the member 8 and is superimposed thereon and has an upwardly turned portion 11. The member 10 is also of sheet metal and is bent to form the opening 5 already mentioned. It has an offset portion which seats on the member 9, as shown in Figures 4 and 5 and the upwardly extending portion 11 of the member 9 fits against it as shown in Figures 4 and 7 and adds strength thereto. The members 8, 9 and 10 are preferably fastened together by rivets, welding, or other suitable means.

Altho I have shown the reinforcing members of sheet metal bent to shape, it is evident that they may be replaced by castings or forgings and still accomplish the same result as I achieve with the construction shown, and I do not limit myself to the use of reinforcing members formed from sheet metal. The sheet metal forming the main body of the base is brought around all of the reinforcing members, as shown, in order to conceal the same, to provide a smooth unbroken surface and to give added strength, the joint where the metal comes together, such as at the ends, being welded together and finished to obscure the joint. The reinforcements are preferably welded or otherwise secured to the main body member.

Openings in the base 2, such as 12 for lamps, may be provided if desired.

It is thus evident that the structure constituting my present invention is strong and light, and inasmuch as it is made from sheet metal the surface will require but little finishing for receiving enamel. When a windshield base of such a construction is made in large quantities, and suitable dies are made for the production of the same, it is evident that the relative cost of this compared with the old construction will be very small.

Formal changes may be made in the specific embodiment of the invention described without departing from the spirit or substance of the broad invention, the scope of which is commensurate with the appended claims.

What I claim is:—

1. A windshield base formed from sheet metal into a substantially hollow shell having inwardly projecting flanges at the open end thereof, and members extending across the open end of said base and secured to said flanges to reinforce said base and provide means for securing said base to a support.

2. A windshield base formed from sheet metal, said base comprising a substantially hollow shell and reinforcing members within said shell, said reinforcing members also forming the support for windshield supports.

3. A windshield base formed from sheet metal into a channel-shaped section having inwardly projecting flanges at the open end thereof, a plurality of reinforcing members extending across the open end of said base and secured to said flanges, one of said members providing means for securing said base to a support, and another of said members forming the support for a windshield support.

4. A windshield base comprising a sheet metal shell and reinforcing members, the reinforcing members at both ends being formed to provide eyes.

5. A windshield base formed of a sheet metal covering of trough-shaped section and reinforcing members therein to reinforce said covering and form means for attaching said base to a support and provide attaching means for windshield supports.

6. A windshield base formed from sheet metal into a substantially U-shaped section and reinforcing members secured interiorly thereof across the open end of the U, the metal at the free ends of the U being turned over said reinforcing members.

7. In combination with a support, a windshield base; said base comprising a sheet metal shell provided with reinforcing members, the end reinforcing members being formed to provide eyes, and the reinforcing members adjacent the support being provided with means for attaching said base to said support.

8. The combination with the cowl of an automobile, windshield supports, and a windshield, of a windshield base formed from sheet metal; said base comprising a substantially hollow shell; members secured within said shell for reinforcing the same; said members comprising means for securing the shell to said cowl and for supporting said windshield supports.

9. The combination with the cowl of an automobile, a windshield and windshield supports, of a sheet metal windshield base; said base formed to a channel section thruout the greater part of its length; said base having reinforcing members situated interiorly thereof; the reinforcing members at the ends being provided with eyes to receive and support said windshield supports.

Signed by me at Detroit, Michigan, U. S. A. this 27th day of July, 1923.

MAX F. WOLLERING.

Witnesses:
ROY C. GAMBLE,
HODGSON S. PIERCE.